MOUNTING FOR ELECTRICAL EQUIPMENT

Filed March 15, 1954

INVENTOR,
Charles R. De Rosso

BY

ATTORNEY.

United States Patent Office 2,777,893

Patented Jan. 15, 1957

2,777,893

MOUNTING FOR ELECTRICAL EQUIPMENT

Charles R. De Rosso, San Gabriel, Calif., assignor to Clary Corporation, a corporation of California Application March 15, 1954, Serial No. 416,148

5 Claims. (Cl. 174—52)

This invention relates to electrical equipment and has particular reference to mountings for supporting such equipment.

In recent years, the use of plug-in units for electrical components has increased. Such plug-in units generally comprise a structure upon which are mounted electrical assemblies or sub-assemblies, the structure being arranged to be plugged in a suitable socket provided on a base chassis. When so plugged, the components carried by the plug-in unit are electrically connected in proper circuit relation to other electrical equipment carried by the base chassis.

A principal object to the present invention is to provide a simple plug-in unit for mounting a series of electrical components.

Another object is to provide a simple and inexpensive means for mounting an electrical component "card" in a supporting frame.

A further object is to provide means for readily mounting a component card in a surrounding frame with the edges of the card spaced from the adjacent portions of the frame.

Another object is to provide a plug-in unit having a component card in which the card may be readily replaced.

The manner in which the above and other objects of the invention are accomplished will be readily understood on reference to the following specification when read in conjunction with the accompanying drawings, wherein.

Figures 1, 2, 3, 4:
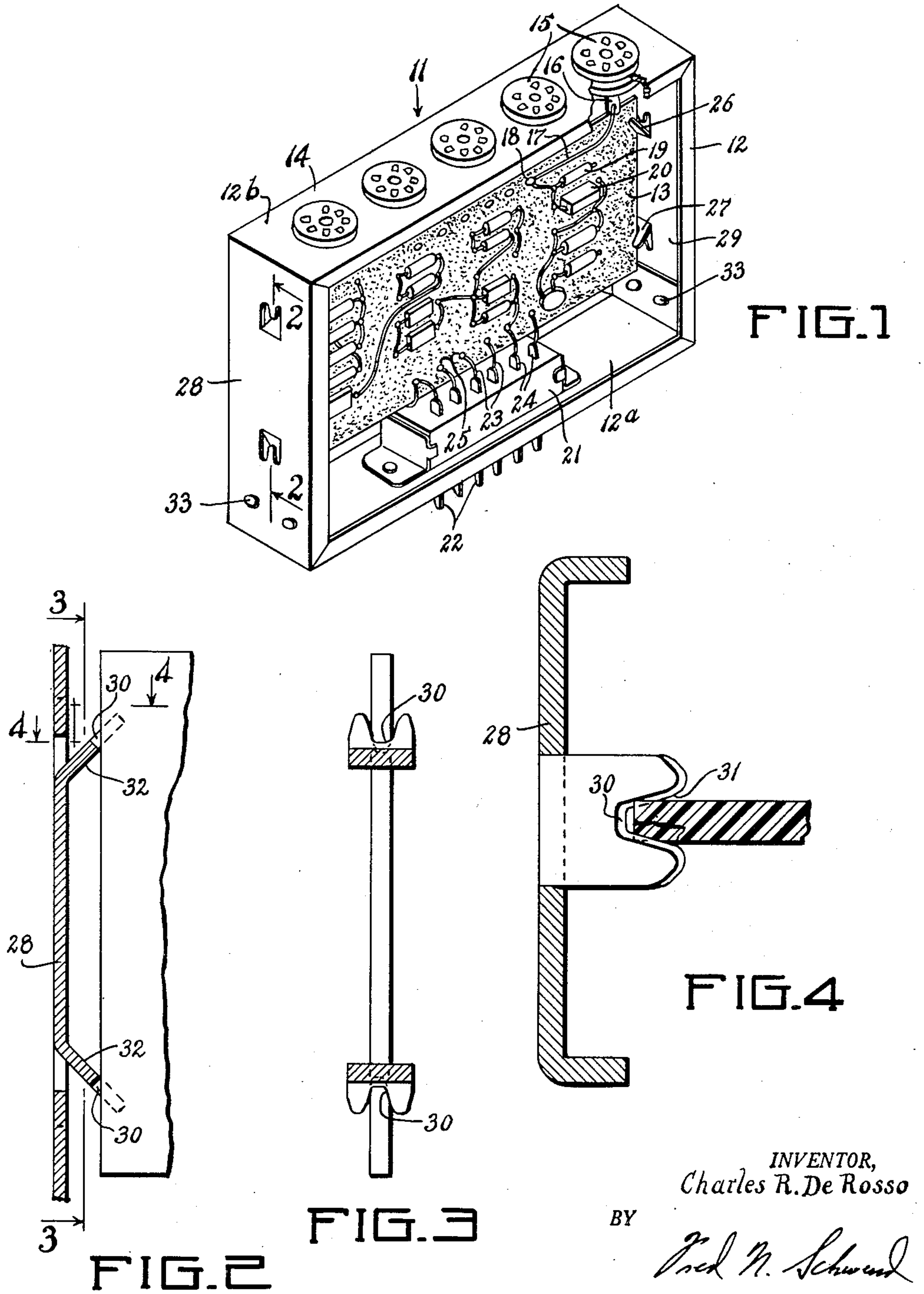
Fig. 1 is a perspective view of an electrical plug-in unit embodying a preferred form of the present invention.
Fig. 2 is a sectional view taken through the left hand portion of the unit along the line 2—2 as shown in Fig. 1.
Fig. 3 is a transverse sectional view taken along line 3—3 of Fig. 2.
Fig. 4 is an enlarged sectional plan view illustrating one of the gripping tabs and is taken along the line 4—4 of Fig. 2.

Referring to the drawing, an electrical plug-in unit generally indicated 11 is disclosed. The latter comprises a box shaped frame 12 of sheet metal forming a hollow rectangular enclosure for an electrical component card 13. The frame 12 is preferably channel shaped in cross-section to effectively strengthen the unit against deflection. Also, the frame is formed of two parts comprising a base piece 12*a* and an upper inverted U-shaped piece 12*b*. The two pieces are secured together by rivets 33.

The upper cross piece 14 of the frame 12 is provided with five equi-spaced circular openings therein in which are suitably secured standard tube sockets 15 formed of plastic or similar electrically insulating material. Terminal connections, i. e. 16, on the under sides of the sockets 15 are connected through suitable flexible wires 17 to terminals, i. e., 18, on the card 13.

The card 13 is formed of plastic or similar insulating material and has secured thereto various electrical components, such as resistor 19, condenser 20, etc., electrically connected to each other and to the terminals, such as 18, according to a desired circuit arrangement.

Preferably, the circuit connections on the card 13 are established by well known printer or etched circuit practices.

An electric plug element 21 is securely mounted in an opening formed in the lower cross piece 12*a* of the frame 12, the device having a series of prongs 22 extending downwardly therefrom for the purpose of plugging the unit into a mating socket (not shown) in a base chassis. Flexible wires 23 electrically connect terminals 24 on the plug device 21 to terminals 25 on the card 13. The terminals 25 are electrically connected in a suitable manner to certain of the components in accordance with the above noted circuit arrangement.

According to the present invention, the card 13 is centered and removably mounted in the frame in spaced relation thereto by four tabs, two of which are illustrated at 26 and 27. The latter tabs are provided in pairs on the two vertical legs 28 and 29 of the frame 12 and are formed by shearing the same from the material of the two legs.

As shown in Figs. 3 and 4 in particular each tab has a substantially V-shaped notch 30 formed therein which is engageable with the adjacent edge of the card 13. The side edges of the notch 30 diverge from the respective leg toward the interior of the frame at an angle of approximately 45°, enabling the same to bite or penetrate into and thereby grip the plastic card. This formation also enables cards of different thicknesses to be used.

In mounting the card in the frame, the former is first located in approximately centered position and the tabs which have been pre-sheared from the respective legs of the frame are bent inwardly at an angle by a suitable tool, causing the lower edges 31 formed by the intersection of the side edges of notch 30 with the undersurface 32 of the tab, to penetrate into the sides of the adjacent edge of the card.

It will be noted, particularly on reference to Fig. 4, that the penetration normally need not be great enough to cause total penetration of the side edges into the material of the card.

Due to the opposite divergence of the upper and lower tabs (which, when in place, preferably extend at an angle of approximately 45° from their respective legs) the tabs prevent any appreciable movement of the card due to vibration, jarring or the like. That is, the upper tabs, i. e., 26, prevent downward movement of the card while the lower tabs, i. e., 27, prevent upward movement.

It will be noted that tabs, i. e., 26 and 27, are effective to maintain the card in spaced relation to the frame, permitting wires to be passed therebetween. Also, since the tabs are centrally located relative to the side edges of the frame, they are effective to accordingly locate the card in a central position so that various components may be mounted on opposite sides of the card and within planes passing through the outer edges of the flanges of the frame. This arrangement permits a plurality of similar units to be mounted directly adjacent each other on a base chassis and yet permit withdrawal of one unit relative to the other without interference.

Although I have described my invention in detail in its preferred embodiment and have therefore utilized certain specific terms and languages herein, it is to be understood that the present disclosure is illustrative rather than restrictive and that changes and modifications may be resorted to without departing from the spirit or scope of the claims appended hereto. For example, the thickness or outer conformation of the tabs may be varied to provide a measure of resilience between the card and the frame 12, permitting the tabs to absorb any jarring or vibration transmitted to the unit from an external source.

Having thus described my invention, what I desire to secure by United States Letters Patent is:

1. A mounting for electrical circuit components comprising a hollow rectangular frame, a sheet-like component supporting card of an insulating material which is softer than the material of the said frame, two bendable tabs extending inwardly from each of at least two opposite sides of said frame, the said tabs on each said side diverging from each other, each said tab extending approximately 45° to the length of the respective side and having a notch opening at one end thereof into the interior of said frame and closed at the opposite end thereof, the side edges of each said notch converging toward said closed end, said side edges being effective upon inward bending of said tabs to penetrate and grip the opposite sides of an adjacent edge of said card whereby to space said card from the sides of said frame and to prevent movement of said card in all directions relative to said frame.

2. A mounting for electrical circuit connections comprising a sheet-like component supporting card of insulating material, a hollow supporting frame for surrounding said card, bendable tabs of a material harder than the material of said card and extending inwardly from at least two opposite sides of said frame, each of said tabs having a notch opening into the interior of said frame, the edges of said notch diverging from each other toward said interior, said edges being effective upon inward bending of said tabs to penetrate and grip the opposite sides of an adjacent edge of said card whereby to support said card against movement in all directions relative to said frame.

3. A mounting for electrical circuit components comprising a hollow rectangular frame, a sheet-like component supporting card of an insulating material which is softer than the material of said frame, two bendable tabs extending inwardly from each of at least two opposite sides of said frame, the said tabs on each said side diverging from each other, and each of said tabs having an inwardly opening substantially V-shaped notch closed at its smaller end and effective upon inward bending of the respective tab to grip the opposite sides of an adjacent edge of said card, said tabs being effective to support said card in said frame and against movement in all directions relative to said frame.

4. A plug-in type mounting for electrical circuit components comprising a rectangular frame having an opening therethrough, a sheet-like electric component supporting card located in said opening, electrical terminals on said card, the top cross piece of said frame having at least one opening therein communicating with said first mentioned opening, an electronic tube socket, means supporting said socket in said last mentioned opening, said socket having downwardly extending electrical terminals, the bottom cross piece of said frame having an opening therein communicating with said first mentioned opening, a plug in said last mentioned opening, means supporting said plug member in said last mentioned opening, said plug member having upwardly extending electrical terminals and downwardly extending prongs adapted to plug into a suitable electrical socket, flexible wires connecting said socket terminals and said plug terminals to certain of said card terminals, two bendable tabs extending inwardly from each of the vertical sides of said frame, said tabs being of a material harder than the material of said card, the said tabs on each said side diverging from each other, each of said tabs having an inwardly opening substantially V-shaped notch effective upon inward bending of the respective tab to penetrate and grip the opposite sides of an adjacent edge of said card whereby to support said card against movement in all directions relative to said frame and in spaced relation to said frame.

5. A plug-in type mounting for electrical circuit components comprising a rectangular frame having an opening therethrough, a sheet-like electrical component supporting card located in said opening, electrical terminals on said card, electric components supported by said card and electrically connected to said terminals, the top cross-piece of said frame having at least one opening therein communicating with the first mentioned opening, an electrical tube socket, means supporting said socket in the last mentioned opening, said socket having downwardly extending electrical terminals, the bottom cross-piece of said frame having an opening therein communicating with the first mentioned opening, a plug member, means supporting said plug member in said last mentioned opening, said plug member having upwardly extending electrical terminals and downwardly extending prongs adapted to be plugged into a suitable electrical socket, means electrically connecting said socket terminals and said plug terminals to said card terminals, two bendable tabs of a material harder than the material of said card and extending inwardly from the side pieces of said frame, each of said tabs having an inwardly opening notch therein, the side edges of each of said notches converging toward each other away from said first mentioned opening, each of said notches being effective upon inward bending of the respective tabs to penetrate and grip the opposite sides of an adjacent edge of said card whereby to support said card against movement in all directions relative to said frame.

References Cited in the file of this patent

UNITED STATES PATENTS

| | | |
|---|---|---|
| 2,542,793 | Brenta | Feb. 20, 1951 |
| 2,579,141 | Eckert | Dec. 18, 1951 |
| 2,611,807 | Lazzery | Sept. 23, 1952 |
| 2,628,270 | Himmel | Feb. 10, 1953 |